INVENTOR.
H.B. IRVIN
BY Hudson & Young
ATTORNEYS

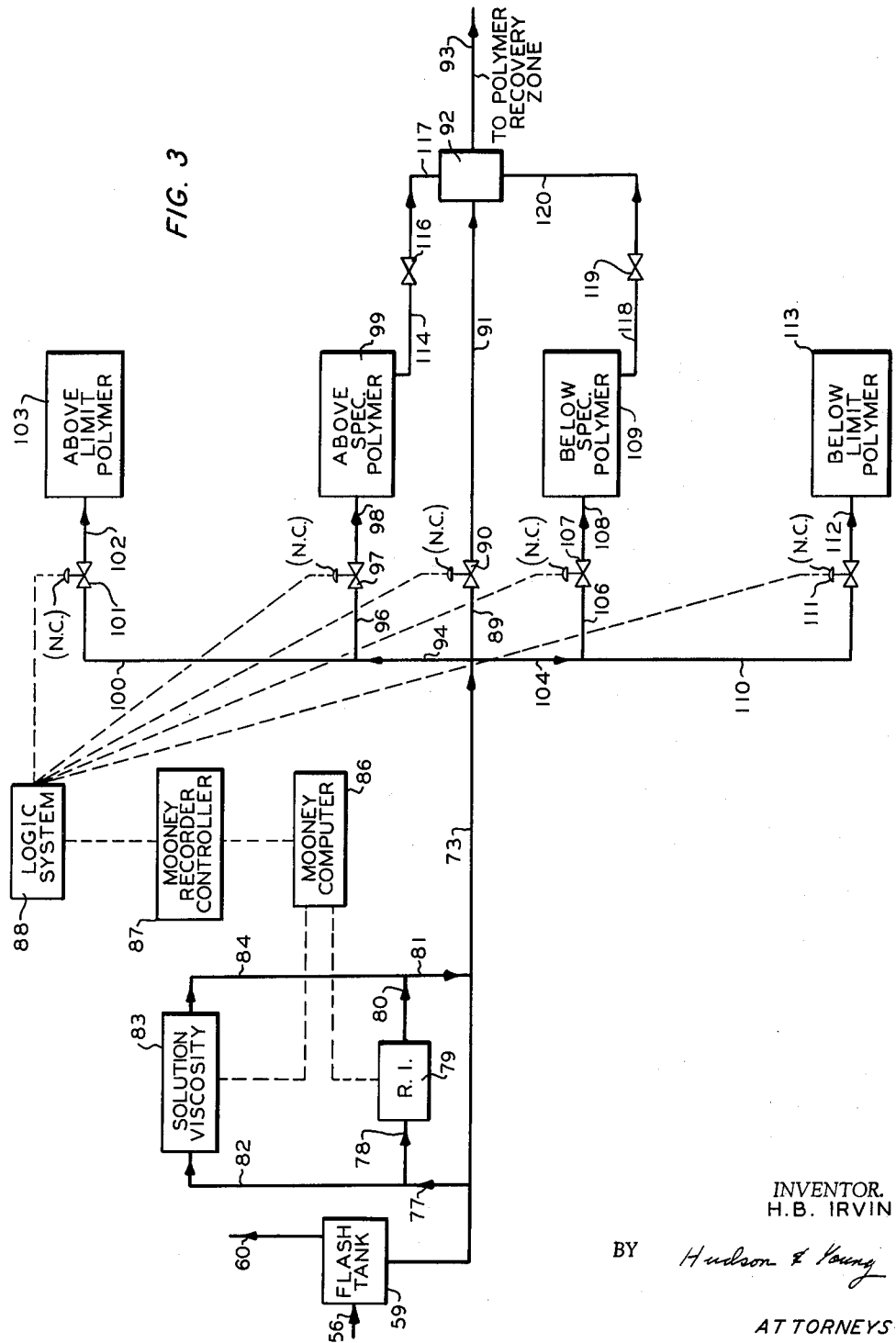

United States Patent Office 3,256,262
Patented June 14, 1966

3,256,262
MEASUREMENT AND CONTROL OF MOONEY VISCOSITY IN THE POLYMERIZATION OF CONJUGATED DIENES
Howard B. Irvin, Bartlesville, Okla., assignor to Phillips Petroleum Company, a corporation of Delaware
Filed May 18, 1961, Ser. No. 111,110
17 Claims. (Cl. 260—94.3)

This invention relates to the measurement of Mooney viscosity of polymers of conjugated dienes. In one aspect, the invention relates to a method for controlling Mooney viscosity in the polymerization of conjugated dienes.

Numerous methods are described in the literature for polymerizing conjugated dienes, such as 1,3-butadiene, including emulsion polymerization, alkali metal-catalyzed polymerization, and alfin-catalyzed polymerization. It has recently been discovered that a polybutadiene containing at least 95 percent cis-1,4-addition can be produced by polymerizing 1,3-butadiene with an initiator comprising an organometal, e.g. a trialkyl aluminum, and a titanium halide, such as titanium tetraiodide, a mixture of titanium tetrachloride and titanium tetraiodide, or a mixture of titanium tetrachloride and iodine. One suitable method for polymerizing conjugated dienes is disclosed in the copending U.S. patent application, Serial No. 578,166, filed April 16, 1956, by R. P. Zelinski and D. R. Smith, now U.S. Pat. 3,178,402.

In the production of cis-1,4-polybutadiene and other conjugated diene polymers in the presence of an initiator system comprising an organometal and a titanium halide, it has been found desirable and sometimes difficult to control the Mooney viscosity of the final product. One reason for the variation in the final Mooney is the variation in poison level in streams fed to the reactors. This change in poison level affects the activity of the initiator for the production of the polymer as well as such properties as molecular weight, Mooney viscosity, inherent viscosity, conversion rate, etc. By conventional practices the effluent from the reaction zone is passed through a series of flash tanks wherein unreacted conjugated diene and a portion of the solvent are removed from the polymer solution. A portion of the bottoms from these flash tanks is then removed and sent to a laboratory for analysis of Mooney viscosity. This is a time-consuming operation resulting in a considerable delay between the time that the reaction conditions have changed and the time that proper remedial action can be taken based on the laboratory analysis.

It is an object of this invention to provide a novel process for the determination of Mooney viscosity of a rubbery polymer of a conjugated diene.

It is another object of this invention to provide a novel process for controlling the Mooney viscosity of a polymer of a conjugated diene.

Still another object of this invention is to provide a novel process for measuring the Mooney viscosity of a polymer of a conjugated diene and controlling the polymerization of the conjugated diene so as to produce a substantially constant Mooney viscosity.

Yet another object of this invention is to provide a novel process for blending polymers of conjugated dienes so as to produce a substantially constant Mooney viscosity.

A further object of the invention is to provide an improved apparatus for the measurement of Mooney viscosity of a polymer of a conjugated diene.

A further object of the invention is to provide an improved process and apparatus for the measurement of Mooney viscosity of a polybutadiene having a high cis-1,4-content, such as from 85 to 98 percent and higher.

Other and further objects and advantages of the invention will become apparent to those skilled in the art upon consideration of the accompanying disclosure.

These and other objects of the invention are broadly accomplished in a process comprising contacting a conjugated diene in a reaction zone in the presence of an initiator and a diluent and recovering an effluent comprising a polymer solution from said reaction zone by the improvement comprising measuring the weight percent solids and the solution viscosity of said effluent and determining the Mooney viscosity from said measurements.

In one aspect of the invention, the thus determined Mooney viscosity is used to adjust at least one process variable so as to maintain a substantially constant Mooney viscosity for the polymer product.

In another aspect of the invention, the thus determined Mooney viscosity is used to divert from the effluent stream that portion of the stream having a Mooney viscosity outside a predetermined range of Mooney viscosity.

In still another aspect of the invention, the aforesaid diverted effluent stream is blended with the polymer product stream in a ratio sufficient to adjust the Mooney viscosity of said stream to within a predetermined range.

Preferably the monomeric material polymerized to produce rubbery polymers comprises a conjugated diene contaning from 4 to 8, inclusive, carbon atoms per molecule. Examples of conjugated dienes which can be used include 1,3-butadiene, 2-methyl-1,3-butadiene (isoprene), 2,3-dimethyl - 1,3 - butadiene, 2-methyl-1,3-pentadiene, chloroprene, 2,3-dimethyl - 1,3 - pentadiene, 2-methyl-3-ethyl-1,3-pentadiene, 2-methoxybutadiene, 2-phenylbutadiene, and the like.

This invention is applicable to the polymerization of the above-defined conjugated dienes either alone or in admixture with each other and/or with, in minor amounts, one or more other compounds containing an active $CH_2=C<$ group which are copolymerizable therewith. Included among these latter compounds are aliphatic 1-olefins having up to and including 8 carbon atoms per molecule, such as ethylene, propylene, 1-butene, 1-hexene, and 1-octene. Branched chain olefins, such as isobutylene, can be used as well as 1,1-dialkyl-substituted and 1,2-dialkyl-substituted ethylenes such as butene-2, pentene-2, hexene-2, heptene-2, 2-methylbutene-1, 2-methylhexene-1, 2-ethylheptene-1, and the like. Other olefins which can be used include di- and polyolefins, such as 1,5-hexadiene, 1,4-pentadiene and 1,4,7-octatriene, and cyclic olefins, such as cyclohexene. Other examples of compounds containing an active $CH_2=C<$ group which are copolymerizable with one or more of the conjugated dienes are styrene, divinyl benzene, 3-vinyl toluene, 1-vinyl naphthalene, 3-methyl styrene, acrylonitrile, methacrylonitrile, methyl arcrylate, methyl methacrylate, vinyl acetate, vinyl chloride, 2-methyl-5-vinylpyridine, 2-vinylpyridine, 4-vinylpyridine, and the like.

The invention is particularly applicable to a process for the polymerization of 1,3-butadiene with an initiator comprising (a) an organometal compound having the structural formula $R_nM$ wherein R is a member selected from the group consisting of alkyl, cycloalkyl, aryl, aralkyl, and alkaryl radicals containing from 1 to 20 carbon atoms, M is a metal selected from the group consisting of aluminum, gallium, indium, zinc, cadmium, beryllium and mercury and $n$ is the valence of the metal and (b) a member selected from the group consisting of (1) titanium tetraiodide, and when M is aluminum, (2) titanium tetrachloride and titanium tetraiodide, and (3) iodine and a titanium halide having the formula $TiX_4$ where X is selected from the group consisting of chlorine and bromine.

One useful organometal-titanium halide system is a trialkyl aluminum with titanium tetrachloride and iodine. This particular system is more fully described in the copending application of Robert P. Zelinski, Serial No. 844,651, filed October 6, 1959. An organometal-titanium halide system comprising $R_3Al$ and $TiI_4$ is disclosed in the copending application of Zelinski and Smith, Serial No. 578,166, filed April 16, 1956. An initiator system utilizing $R_3Al+TiCl_4+TiI_4$ is disclosed in the copending application of Naylor and Hooten, Serial No. 754,175, filed August 11, 1958, now U.S. Pat. 3,205,212.

The polymerization process of this invention is usually carried out in the presence of a diluent. Diluents suitable for use in the process are hydrocarbons which are substantially inert and nondetrimental to the polymerization reaction and include aromatics, such as benzene, toluene, xylene, ethylbenzene and mixtures thereof; straight and branched chain paraffins which contain up to and including 12 carbon atoms per molecule including normal pentane, isopentane, normal hexane, isohexane, 2,2,4-trimethylpentane (isooctane), normal decane, mixtures of these paraffinic hydrocarbons and the like; aromatic halides such as chloronaphthalene and the like; and cycloparaffins, such as cyclohexane and methylcyclohexane. Furthermore, mixtures of any of the aforementioned compounds can be used as diluents. It is usually preferred to carry out the polymerization in the presence of an aromatic hydrocarbon since polymers having the higher cis contents are produced when operating in this manner.

The polymerization process can be carried out at temperatures varying over a rather wide range such as from —100 to 250° F. The selection of the proper temperature and pressure depends upon the particular diluent and initiator selected. The polymerization reaction is generally carried out under autogenous pressure or at any suitable pressure, preferably sufficient to maintain the reaction mixture substantially in the liquid phase. It is to be understood also that it is generally necessary to conduct the polymerization in the fluid state in order to most effectively utilize the method of this invention so that adequate mixing can readily occur.

It will be readily understood by those skilled in the art that the particular mole ratio of titanium halide to organometal depends on the organometal used. However, within any given initiator system it is necessary that the ratio be maintained within that ratio range peculiar to that initiator system in order to initiate and sustain the reaction. Generally, the mole ratio of metal/Ti at the time of initiation of the reaction is in the range of 1.5:1 to 15:1 while the ratio can be in the range of 0.75:1 to 2:1 at termination. For Al/Ti the ratio is generally in the range of 15:1 to 2:1 during polymerization although the initial ratio is sometimes higher. It is to be further understood that not all portions of the above ranges are operable for all organometals.

As discussed hereinbefore, the Mooney viscosity of polymer discharged as bottoms from the flash tank may vary depending on several factors such as the poison level in feed streams to the reactors. I have discovered that the measurement of solution viscosity and weight percent polymer of the polymer solution yields information which can be utilized to compute Mooney viscosity of the polymer, thereby making it possible to more effectively and quickly control the reaction.

Solution viscosity and weight percent polymer are readily and rapidly determinable by many methods known to those skilled in the art. For instance, one method of determining solution viscosity is the withdrawal of a sidestream of the polymer solution and pumping said polymer solution at a constant rate through a uniform circular tube in a constant temperature bath. The pressure drop is proportional to the solution viscosity. Commercial viscosimeters produced for sale by various instrument companies may also be utilized for the measurement of solution viscosity. Acceptable viscosimeters are (1) Continuous Indicating and Recording Viscosimeter Model No. 1,077 or Model No. 1251B produced by the Hallikainen Instrument Company, and (2) Continuous Polymer Viscosimeter Model No. 1218 produced by the Norcross Instrument Company.

The amount of polymer present in the polymer solution in terms of weight percent is determinable from a number of related properties, such as refractive index, infrared absorption, ultraviolet absorption, chromatographic absorption and the like. Particularly suitable for in-line determinations is a high temperature differential refractometer such as produced by Consolidated Electrodynamics Corporation, Pasadena, California, and described in Bulletin No. 1839.

The Mooney viscosity of polymer recovery from solutions is conventionally determined by ASTM Method D 927–57T.

Although the particular relationship of solution viscosity, weight percent solids in solution, and Mooney viscosity of the polymer depends on the particular polymer, temperature and shear rate, the following equation has been found satisfactory for correlating the Mooney viscosity of a cis-1,4-polybutadiene solution in a concentration of 1 to 20 weight percent with the solution viscosity being measured at 150° F. and at a shear rate of 100 sec.$^{-1}$.

$$ML = \frac{\log_{10}\mu + 789.3 - 526.8(RI)}{1.484 - 0.9798(RI)}$$

where

ML is Mooney viscosity,
RI is refractive index, and
$\mu$ is solution viscosity in poise.

The determination of the above or similar equations or the adaptation of same to fit particular requirements is well within the skill of the art. From this relation a simple calculation will result in a determination of Mooney viscosity much more rapidly than by heretofore used methods. In addition, analog or digital electronic computers are readily available which will receive a continuous or pulse type signal representative of the solution viscosity and another signal representative of the refractive index and produce a third signal representative of the Mooney viscosity. Suitable analog computers include Model TR–10, Electronic Associates, Inc., Long Branch, New Jersey, and Model CM–3, Southwestern Industrial Electronics Corp., Houston, Texas.

This Mooney viscosity determination may be used to control a process variable so as to produce a polymer having a substantially uniform Mooney viscosity. One important process variable is the concentration of initiator within the reactor. A preferred method of controlling the concentration is by adjusting the rate of introduction of initiator into the reactor although it is also within the scope of the invention to vary the ratio of initiator components. A change in the concentration of initiator has several effects, including an effect on Mooney viscosity. For example, when polymerizing 1,3-butadiene in the presence of iodine, titanium tetrachloride and triisobutylaluminum at a constant ratio of initiator components, a decrease in initiator concentration can result in an increase in conversion rate, inherent viscosity, Mooney viscosity and molecular weight. At a given ratio of iodine to titanium tetrachloride, increasing the amount of TIBA produces slightly higher cis contents, lower molecular weights, lower inherent viscosity and lower Mooney values. Further, at a given ratio of TIBA to titanium tetrachloride, increasing the amount of iodine increases the yield and molecular weight, increases the reaction rate and increases the Mooney viscosity. However, it should be noted that for some systems there may be limitations to the range within which the catalyst component ratios may be adjusted without affecting yield or cis-4 content.

Another process variable which is controllable by Mooney viscosity relationships is the blending of polymers which are outside of predetermined limits. These aspects of the invention will be discussed hereinafter in relation to the drawings, particularly FIGURES 3 and 4.

FIGURE 3 illustrates the feature of diverting polymer from the main product stream.

To more fully describe my invention reference is now made to the drawings. In discussing the process in connection with the drawings reference is made to specific materials and reaction conditions for purposes of simplicity. It should be understood, however, that my invention is not limited in this fashion.

Figure 1:
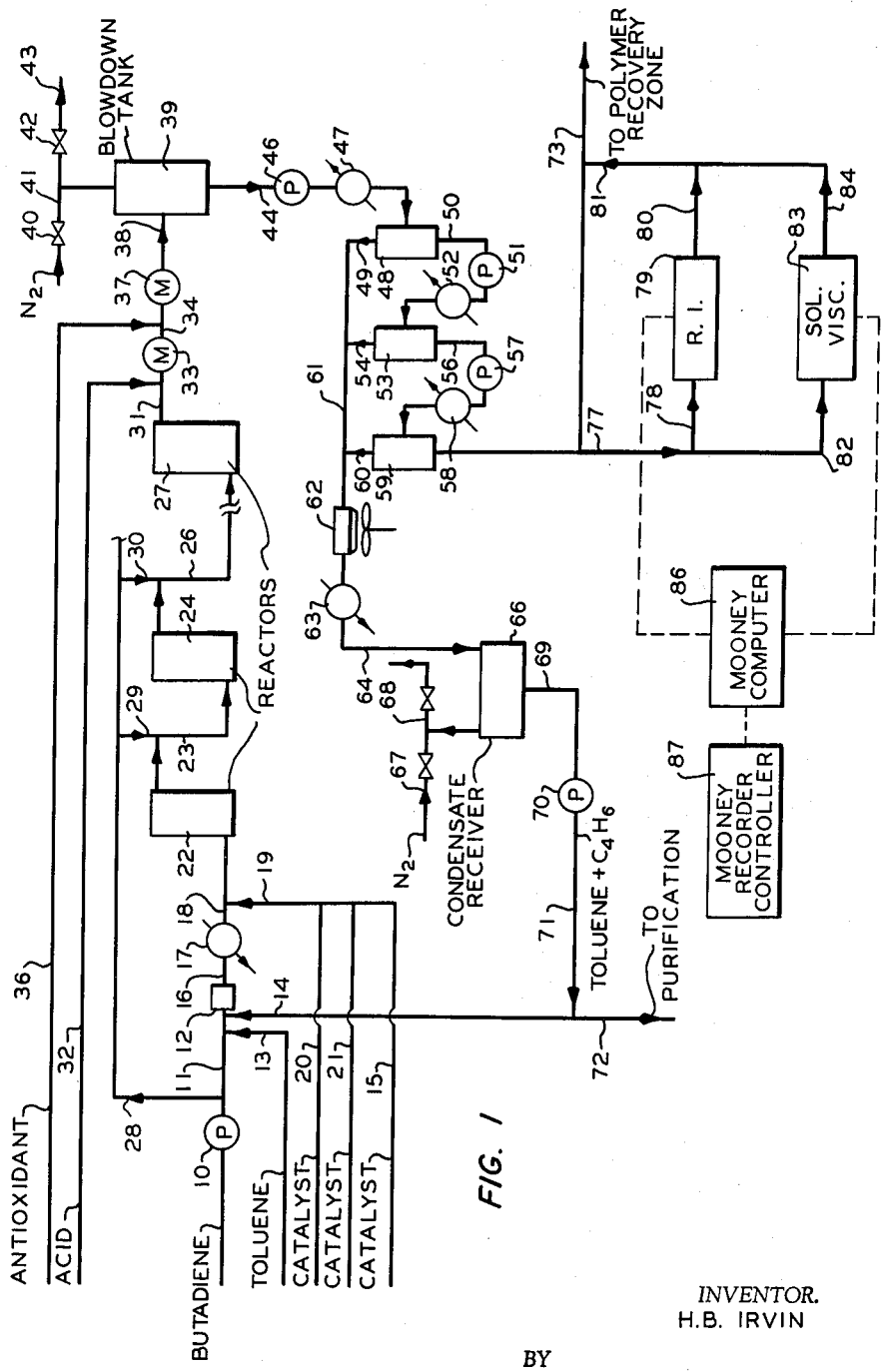
FIGURE 1 represents a general flow sheet for the production of cis-1,4-polybutadiene and further describes the method of this invention for determining Mooney viscosity.

In FIGURE 1 butadiene is continuously fed by pump 10 through line 11 to mixing zone 12, such as a multiorifice contactor. Reaction diluent, toluene, is continuously fed into line 11 through line 13 and likewise a recycle stream containing toluene and butadiene is fed to line 11 through line 14. Thus the recycle materials and the fresh butadiene and reaction diluent are thoroughly mixed in contactor 12. This mixture is then passed through line 16 to heat exchanger 17 wherein the mixture is cooled, preferably to about 5 to 25° F. Initiator is then added to the cooled mixture of monomer and diluent in line 18 through lines 15 and 19. Iodine is added through conduit 20 and a titanium tetrachloride through line 21; while a solution of triisobutylaluminum is added through line 15. The butadiene is contacted with the initiator under polymerization conditions in line 18. The reacting mixture passes through line 18 to reactor 22.

The effluent from reactor 22 passes through line 23 to reactor 24 and the effluent from reactor 24 likewise passes through line 26 to a downstream reactor in series, finally entering the last reactor 27 in the series. Any number of reactors can be employed in this series; preferably at least 3 reactors and generally not more than 12 to 15 are used. The pressure of the reaction is maintained so that the reaction mixture is in a liquid phase. The preferred operating temperature is in the range of 10 to 100° F. and I prefer to operate the reactors in series so that the temperature of the first reactor is less than the temperature of the final reactor. The temperature of the intermediate reactor can be at values intermediate the first and final reactor of the series. I have found that this is desirable in order to keep the temperature of any reactor from going above a desired maximum. Since the concentration of monomer is highest in the first reactor, there is a tendency for a more rapid reaction therein and by maintaining the temperature of the first reactor at a lower value than in the subsequent reactors it is much easier to maintain the reaction within the desired operating limitations.

As an alternative to the gradation of operating temperatures in the reactors in series, I can add monomer incrementally to the reaction by passing a portion of the butadiene from line 11 through line 28 and introducing this portion to the downstream reactions via lines 29 and/or 30 and so forth. By varying the amount of monomer added in this fashion it is also possible to control the viscosity or Mooney of the polymer in the finished product; for example, by adding a portion of the monomer to the downstream reactors I can increase the Mooney value of the final polymer. The Mooney value can also be decreased or increased by increasing or decreasing, respectively, the amount of initiator fed to the reactor.

As the reaction effluent leaves the last reactor 27 in the series and passes through line 31 a nonvolatile initiator inactivating agent having active hydrogen groups is added through line 32 in an amount sufficient to inactivate the initiator. The reaction effluent and the inactivating agent are thoroughly mixed in mixer 33. By "nonvolatile" I refer to the relative volatility of the agent under the conditions employed to separate unreacted material from the reactor effluent. Since these recovered materials are to be recycled to the reaction it is important that essentially all of the initiator inactivating agent remain with the polymer and initiator. It is only through the use of such relatively nonvolatile agents that I can stop the reaction by adding excess initiator poisoning immediately following the reactors and prevent recycling initiator inactivator to the reactor feed via stream 14. A carefully metered amount of water can be used under certain conditions. Examples of suitable nonvolatile initiator inactivating agents are rosin acid, hydroquinone, pyrogallol, catechol, guaiacol, benzoquinone, tetraphenylhydrazine, aniline, quinoline, nitrobenzene, benzyl mercaptan and the like. In general, materials can be used from such classes as fatty acids, e.g. stearic acid, glycols, e.g. glycerol monoesters, alkyl gallates, xanthogen polysulfides, N-substituted dithiocarbamates, glycerol, alkyl polysulfides, furfural, and the like. It should be appreciated that the above list is not exhaustive but is given to provide a better understanding of what is meant by my generic description.

For a further and more complete description of the addition of the rosin acid, reference is hereby made to the copending application of Robert F. Dye, Serial No. 45,042, filed July 25, 1960, now U.S. Pat. 3,099,648.

As the effluent stream leaves mixer 33 through line 34, antioxidant is added via line 36 and the stream again passes through a mixer 37 and thence through line 38 to surge tank 39. Any of a number of well known rubber antioxidants can be used, for example, N-isopropyl-N'-phenyl-p-phenylenediamine, N-phenyl-N'-cyclohexyl-p-phenylenediamine, and the like. One or more surge tanks can be employed and all of these tanks should be blanketed with an inert gas such as nitrogen. The pressure within these tanks is maintained by pressurizing the tank with nitrogen by opening valve 40 in line 41 or the pressure can be reduced by venting the vapors in tank 39 to a flare by opening valve 42 in line 43. This pressure control can, of course, be done automatically.

The effluent stream in which the initiator has been inactivated passes from surge tank through line 44, pump 46 and heater 47 to flash tank 48. The pressure of the stream is increased substantially by pump 46, heated in exchanger 47 and then reduced to about atmospheric pressure or slightly above in flash vessel 48. Flashed vapors are withdrawn overhead from vessel 48 through conduit 49 while the unvolatilized liquid is withdrawn through conduit 50. This flashing operation is then repeated by repressurizing the liquid in conduit 50 in pump 51 and heating in exchanger 52. The pressure is again let down in flash vessel 53, flashing vapors which pass overhead through conduit 54. This operation is performed again with the liquid in conduit 56 utilizing pump 57 and exchanger 58, the third flash occurring in vessel 59. Vapors from vessel 59 pass overhead in conduit 60 and all the flashed vapors are gathered in header 61.

Pumps 46, 51 and 57 can be operated so that the pressures developed decrease sequentially.

The overhead vapors from flash vessels 48, 53 and 59 pass through line 61 to air cooled condenser 62 and thence to cooler 63. The condensed liquid which contains butadiene and a substantial amount of toluene is passed through line 64 to condensate receiver 66. The pressure in receiver 66 is maintained in the same fashion as discussed in connection with storage tank 39 utilizing a blanket of nitrogen which enters through line 67. Vapors can be vented through line 68. The condensate is withdrawn from receiver 66 through line 69 and passed by pump 70 through line 71. Most of this condensate is recycled through line 14 to the polymerization process as previously described. A portion of the condensate is purged through line 72 to a purification operation in order to keep volatile impurities from building up in the system. The effluent stream is withdrawn from the last flash vessel 59 in the series and is passed via line 73 to subsequent recovery operations. At this point substantially all of the unreacted butadiene has been removed and the concentration of the polymer in the solvent has increased materially, for example, for about 5 to 15 weight percent.

While not shown in the drawings, this polymer solution in line 73 can be passed to a storage tank and the polymer then recovered from the solution by steam stripping to remove the solvent. A slurry of polymer crumb in water is passed to a storage tank and the polymer is separated from the slurry by passing over a shaker screen, through a compacting auger and finally through an extruder-drier.

A portion of the polymer solution in conduit 73 is removed through conduit 77 and passed to the refractive index measuring zone 79 through conduit 78 and the solution viscosity measuring zone 83 through conduit 82. After the measurements of refractive index and the solution viscosity have been made the polymer solution is returned to the product stream 73 via conduits 80, 84 and 81. In the preferred method of operation the instruments for determining refractive index and the solution viscosity produce a signal proportional to these determinations which is transmitted to a computer 86 which is built from commercial computer building blocks. Mooney computer 86 receives these signals and translates them into a signal proportional to the Mooney viscosity. A satisfactory equation for determining this Mooney from these measurements has been hereinbefore discussed. The signal produced by computer 86 is then transmitted to a Mooney recorder controller 87 which translates the signal into useful information.

Figure 2:
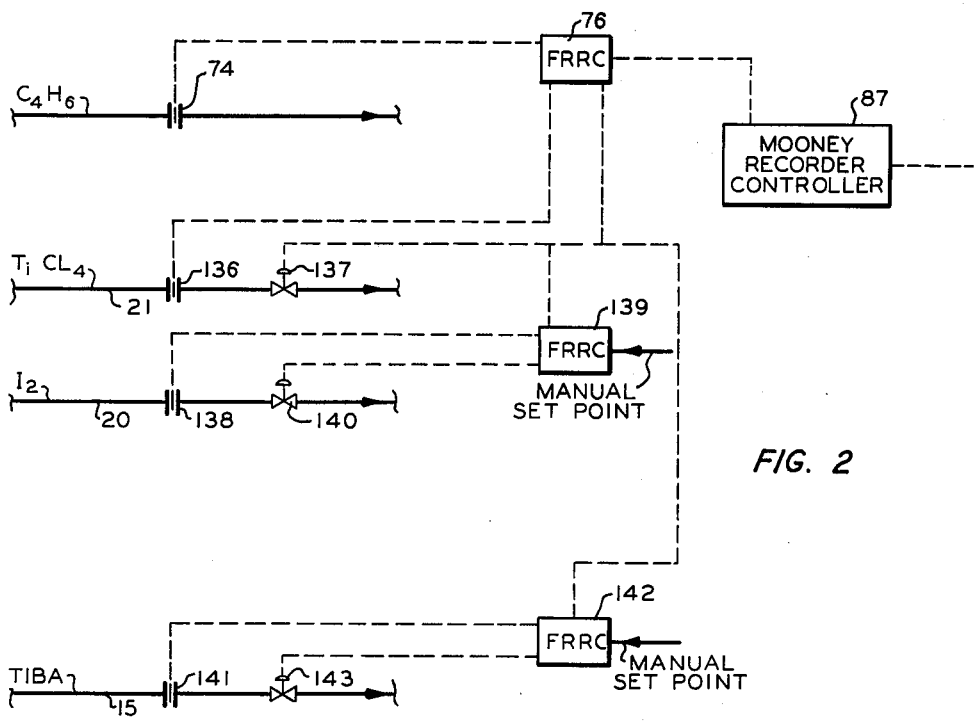
FIGURE 2 is a diagrammatic representation of a method of controlling catalyst input by one aspect of this invention.

As shown in FIGURE 2, controller 87 is used to control the introduction of initiator into the reactor 22 through conduit 18. In this aspect of this invention, not only is the total amount of initiator entering the reactor maintained substantially constant but the ratio of initiator to monomer is also maintained constant while simultaneously maintaining the ratio of the individual initiator components substantially constant. A flow sensing device 74 disposed in the butadiene inlet conduit transmits a signal to flow rate ratio controller 76 proportional to the flow rate of the butadiene being introduced into the reaction zone. When the Mooney viscosity changes as determined by the methods hereinbefore described Mooney recorder controller 87 transmits a signal which manipulates the set point of FRRC 76. Since it is important that the ratio of initiator components and he ratio of total initiator to diolefin be maintained substantially constant it is necessary that some control be maintained over these variables. This may be done manually or by any suitable instrumentative device known to those skilled in the art. By the instrumentative devices illustrated in FIGURE 2 the ratios of initiator components and butadiene are controlled by three separate flow rate ratio controllers. The ratio of titanium tetrachloride to butadiene is maintained at a substantially constant preset value by FRRC 76 which receives signals from flow sensing devices 74 and 136 and actuates motor valve 137 disposed in conduit 21 so as to regulate the flow of titanium tetrachloride proportional to the flow of butadiene. The flow of iodine and triisobutyl aluminum are similarly maintained and kept in a fixed ratio to the butadiene flow and to each other. FRRC 139 receives signals from FRRC 76 and flow sensing device 138 proportional to the flow of butadiene and iodine, respectively, and actuates motor valve 140 so as to maintain a substantially constant flow ratio of iodine to butadiene. FRRC 142 receives signals from FRRC 76 and flow sensing device 141 disposed in conduit 15 so as to permit the actuation of motor valve 143 disposed in conduit 15 thereby maintaining flow rates of TIBA and butadiene at a substantially constant ratio. If the Mooney viscosity changes, the signal from controller 87 manipulates the set point of FRRC 76 which in turn manipulates the manually set point of FFRC 139 and 142.

FIGURE 3 illustrates the aspect of the invention wherein the portion of the polymer solution passing through conduit 73 which is outside the desired Mooney viscosity range is diverted from said conduit 73 for subsequent blending or disposal based on a determination of the Mooney viscosity by the method of this invention. The reference numerals in FIGURE 3 for those items which are in common with the previous figures are identical and further discussion of their function will be limited to their application in this aspect of the invention. Polymer solution which is within the predetermined desired range passes through conduits 73, 89, valve 90, conduit 91, mixing zone 92, which may be a surge tank containing an agitator or an in-line power driven mixer, and into conduit 93 for passage to the polymer recovery zone. Although valve 90 is normally closed, it is opened either manually or by proper instrumentation when Mooney recorder controller 87 indicates that the Mooney is within the predetermined desired range. In one convenient instrumentation system this signal from controller 87 is transmitted to a logic system 88 which will decide whether valves 90, 97, 101, 107 or 111 should be opened. This logic system may be any device suitable for making the decision as to which valve to open in response to a signal from controller 87. In its simplest form, the logic system is a human being who makes a direct visual observation of the recorder stylus and opens the proper valve. However, more conveniently an instrument capable of making the decision is employed such as described in "Process Instruments and Controls Handbook" by D. M. Considine, pages 9–55 and pages 10–49 (1957). If the polymer is above specification, or predetermined desired limits, but within a range at which it may be subsequently blended, valve 97 is opened and valve 90 closed and the polymer is diverted from conduit 89 into conduits 94, 96, through valve 97 and conduit 98 into a surge vessel 99. If the polymer is above the desired limit for blending, the valve 101 is opened instead and the polymer continues from conduit 94 through conduit 100, valve 101, conduit 102 and into surge vessel 103. A similar arrangement is used for polymer which is below specification. When the polymer is below specification but within blending range valve 107 is opened and polymer solution passes from conduit 73 through conduits 104, 106, valve 107, conduit 108 and into surge vessel 109. If the polymer is below the limit desired for blending, valve 111 is opened instead and the polymer continues from conduit 104 through conduit 110, valve 111, conduit 112 and into surge vessel 113. That portion of the polymer which has been collected in vessels 103 and 113 may be either discarded or subsequently used in various ways.

It is possible to blend polymers having different Mooney viscosities to attain a polymer having the desired Mooney viscosity since the relationship is a simple linear function of the Mooney viscosity. Therefore, it is possible for the high Mooney polymer contained in tank 99 to be blended with the low Mooney polymer in tank 109 to obtain polymer of the predetermined desired Mooney viscosity. To achieve this the average Mooney viscosities within tanks 99 and 109 are determined and the amount of each necessary to achieve the desired Mooney is calculated. Valves 116 and 119 are then opened to the desired position thereby permitting high Mooney polymer from vessel 99 to pass through conduit 114, valve 116 and conduit 117 into mixing tank 92 where it meets low Mooney polymer passing from tank 109 through conduit 118, valve 119, and conduit 120. The off-specification polymers are then thoroughly mixed in mixing tank 92 with the polymer being passed through valve 90 and conduit 91, if any, and thus becomes acceptable polymer passing through conduit 93 to the polymer recovery zone.

Figure 4:
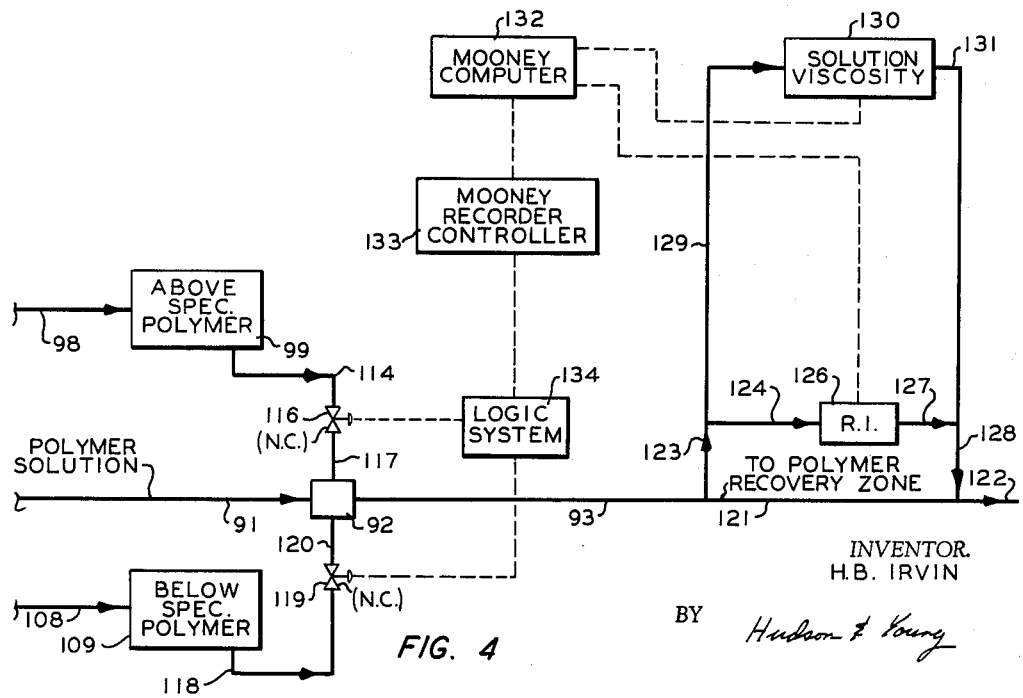
FIGURE 4 illustrates the feature of blending polymers of different Mooney viscosities into the main product stream.

FIGURE 4 illustrates that aspect of the invention wherein the determination of solution viscosity and refractive index of the polymer passing through the main product stream 91 is used to control the amount of the high Mooney polymer and/or low Mooney polymer being continuously introduced into mixing tank 92 so that when the polymer solution passing through conduit 91 is within the predetermined desired range but outside a narrower preferred desired range, the proper amount of high and/or low polymer will be introduced into mixing tank 92 to bring the polymer within the preferred range. As shown in FIGURE 4, the off-specification polymer has been diverted into tanks 99 and 109 as hereinbefore described for FIGURE 3. The reference numerals which are in common with those of hereinbefore described figures are identical. The main product stream passes through conduits 93, 121 and 122 to the polymer recovery zone (last shown). A portion of the product stream is diverted from conduit 93 into the refractive index measuring zone 126 through conduits 123 and 124. A portion of this portion continues through conduit 129 to the solution viscosity measuring zone 130. These measurements are made as hereinbefore described in FIGURE 1. Upon the completion of the measurements the portion passing through the refractive index measuring zone 126 continues through condiuts 127 and 128 and is combined with the portion from the solution viscosity measuring zone 130 from conduit 131 into the main product stream 122. As described hereinbefore with reference to FIGURE 1, a signal proportional to the refractive index and a signal proportional to the solution viscosity is transmitted to the Mooney computer 132 wherein a signal proportional to the Mooney viscosity, calculated as hereinbefore described for FIGURE 1, is transmitted to Mooney recorder controller 133 which not only records the Mooney viscosity visible but also passes this information to a logic system 134 which has been heretofore supplied with information which permits it to decide whether to open valve 116 or valve 119. This logic system can be a person or an instrumentation system as hereinbefore described. For example, if the predetermined Mooney range for polymer passing through conduit 91 is 45 ± 5 but the preferred range is 45 ± 2 and the polymer passing through conduits 93 and 123 has a Mooney of 49 determined as hereinbefore described, logic system 134 transmits a signal to valve 119 to permit the introduction into conduit 91 of polymer which is below the predetermined range so as to bring the polymer solution within the range of 45 ± 2. When the Mooney reaches the preferred range as determined by the system hereinbefore described, valve 119 is closed. Since completely closing valves 119 or 116 may result in excessive cycling, it is within the scope of the invention to keep either or both of the valves partially open until the polymer in stream 91 returns to the desired Mooney range. It is also within the scope of the invention to open valve 116 or 119 proportional to the variance in the Mooney viscosity, as determined by computer 132, from the desired level.

EXAMPLE I

As an example of my invention the following specific operation is described in detail with reference to the flow as shown in the above-discussed drawing. In this example nine reactors are employed in series operating at the pressure and temperature shown in Table I. Polybutadiene is formed by contacting butadiene with an initiator which contains triisobutylaluminum in combination with titanium tetrachloride and iodine to a total conversion of 60 percent. The residence time in the nine reactors is 2.1 hours. The initiator is quenched after polymerization by the addition of rosin acid in an amount sufficient to provide about 2 pounds per hundred of rosin acid in the recovered polymer. This is somewhat in excess of twice the amount necessary to fully quench the initiator. Methylene-2,2'-bis[4-methyl-6-tert-butylphenol] is added as an antioxidant. The effluent in which the initiator has thus been inactivated is flashed in three zones in series. The vaporized material is recycled in part and purged in part, and the unvaporized material is passed to subsequent operations for polymer recovery.

TABLE I

| Vessel | Temperature (° F.) | Pressure (p.s.i.a.) | Incremental Conversion (percent) |
|---|---|---|---|
| Reactor 1 (22) | 25 | 65 | 15.7 |
| Reactor 2 (24) | 31 | 65 | 10.3 |
| Reactor 3 | 35 | 64 | 7.5 |
| Reactor 4 | 38 | 64 | 6.5 |
| Reactor 5 | 39 | 63 | 5.3 |
| Reactor 6 | 40 | 63 | 4.2 |
| Reactor 7 | 40 | 62 | 3.9 |
| Reactor 8 | 40 | 61 | 3.6 |
| Reactor 9 (27) | 40 | 60 | 3.0 |
| Storage (39) | 40 | 20 | |
| Exit Heater (47) | 340 | 370 | |
| Flash 1 (48) | 227 | 16 | |
| Exit Heater (52) | 340 | 280 | |
| Flash 2 (53) | 235 | 16 | |
| Exit Heater (58) | 328 | 205 | |
| Flash 3 (59) | 235 | 16 | |
| Receiver (66) | 100 | 15 | |

A portion of the polymer solution in conduit (73) is continuously withdrawn and a determination made of its solution viscosity and weight percent solids. From this data computer 86 determines the Mooney viscosity. A signal is then continuously transmitted to Mooney recorder controller 87. This controller is preset so as to manipulate the set point of FRRC 76 when the Mooney viscosity is outside the predetermined desired range of 45±2. If, for various reasons, the Mooney of the polymer product increases as determined by computer 86, controller 87 then manipulates the set point of FRRC 76 so as to increase the amount of initiator being introduced into the reactors to a total of 1350#/SD until the Mooney decreases to within the desired range. These changes and results are tabulated in Table II.

TABLE II.—PHYSICAL PROPERTIES OF POLYMER SOLUTION (73)

| | Original | Before Initiator Adjustment | After Initiator Adjustment |
|---|---|---|---|
| Polymer, wt. percent (79) [a] | 14.7 | 14.7 | 14.7 |
| Solution Viscosity, poise (83) [b] | 44 | 58.9 | 48.6 |
| Mooney Viscosity [c] | 46 | 55 | 49 |

[a] Determined on a high temperature differential refractometer described in Bulletin No. 1839, Consolidated Electrodynamics Corporation, Pasadena, California.
[b] Determined on a Model No. 1251B Viscosimeter, Hallikainen Instruments.
[c] Calculated by the following equation:

$$ML = \frac{\log_{10} \mu + 789.3 - 526.8 \, (RI)}{1.484 - 0.9798 \, (RI)}$$

where

ML = Mooney viscosity
RI = Refractive index
$\mu$ = Solution viscosity, poise

The data used to develop this equation measured $\mu$ at 150° F. and at a shear rate of 100 sec$^{-1}$.

EXAMPLE II

To illustrate a second aspect of the invention shown in FIGURE 3 the Mooney of the polymer passing to the polymer recovery zone is controlled by diverting all polymer from stream 73 which does not fall within the desired range of 45±5. The Mooney of the polymer in stream 73 is determined by computer 86 as in Example I and a signal transmitted to controller 87. Valves 90, 97, 101, 107, 111, 116 and 119 are normally in a closed position. Controller 87 then transmits a signal to logic system 88 which then decides which valve to open based on the Mooney of the polymer in stream 73 as shown in Table III.

TABLE III

| Mooney: | Valve (90) | (97) | (101) | (107) | (111) | (116) | (119) | Total Stream, lb./SD |
|---|---|---|---|---|---|---|---|---|
| <20 | | | | | open | | | 0 |
| 20-39.99 | | | | open | | | | 9,224 |
| 40-50 | open | | | | | | | 927,707 |
| 50.01-90 | | open | | | | | | 9,709 |
| >90 | | | open | | | | | 0 |
| Total (93) | | | | | | | | 946,640 |

It will be seen that most of the polymer (approximately 98 percent) is acceptable and only a small portion needs to be diverted from the main stream.

EXAMPLE III

The polymer solutions of Example II which have been diverted into vessels 99 and 109 are periodically blended together to produce a polymer having a Mooney of 45. The vessels 99 and 109 contain agitators which provide a uniform blend of the polymer solutions contained therein. The amount of each batch necessary to produce a final Mooney of 45 (a simple linear relationship of Mooneys) is determined and values 116 and 119 are manually opened so as to produce the desired flow rates from each vessel and the batches are reintroduced into the main polymer stream 93 through mixing tank 92.

TABLE IV

| | |
|---|---|
| Ave. Mooney 99 | 47.3 |
| Ave. Mooney 109 | 43.1 |
| Total quantity 99, #/SD | 9709 |
| Total quantity 109, #/SD | 9224 |
| Blend 117, #/SD | 8400 |
| Blend 120, #/SD | 9224 |
| Ave. Mooney 93 | 45 |

EXAMPLE IV

Additional runs are made to illustrate the aspect of the invention depicted in FIGURE 4 wherein the Mooney of the polymer is controlled within a narrow range by blending in either high or low Mooney polymer as needed. The stream 73 is diverted as described in Example II. The stream passing through line 93 contains polymer having a Mooney of 49. A range of 45±2 is desired. A portion of stream 93 is diverted through the means for measuring the solution viscosity and refractive index of the diverted stream. The information is transmitted to computer 132 wherein a signal proportional to the Mooney is transmitted to controller 133. Valves 116 and 119 are normally closed. Logic system 134 receives a signal from controller 133 and decides, on the basis of predetermined values fed to it, to open valve 119. Valve 119 remains open until the Mooney again reaches 46.9 at which time it is closed or periodically adjusted to maintain the Mooney of the blend in line 93 at 45±2.

TABLE V

| | Conduit (91) | Conduit (120) | Conduit (93) |
|---|---|---|---|
| Solution Viscosity, poise | 48.6 | 40 | 48.6 |
| Polymer, wt. percent | 14.7 | 14.7 | 14.7 |
| Mooney, before combining [1] | 49 | 43.1 | 49 |
| Polymer, lbs | 11,000 | 6,080 | 17,080 |
| Mooney, after combining [1] | 49 | 43.1 | 46.9 |

[1] Determined from the equation in Example I.

While certain examples, structures, compositions and process steps have been described for purposes of illustration, this invention is not limited to these. Variation and modification within the scope of the disclosure and the claims can readily be effected by those skilled in the art.

For example, in some instances it is desirable to add the trialkylaluminum initiator component to the feed stream in a predetermined amount prior to introducing the other initiator components. This is advantageous since the trialkylaluminum acts as a scavenger to remove initiator poisons from the feed stream thereby reducing the "effective" amount of trialkylaluminum. Since the catalyst level to the reactor is important, it is readily apparent that the portion of catalyst used in scavenging must not only be replaced but must be metered into the system accurately. One convenient way of regulating the trialkylaluminum level is by the determination of the trialkylaluminum content in the inlet conduit to the reactor and then adjusting the predetermined amount of this component introduced into said conduit in response to said determination. For even more stable control a system may be provided in which the trialkylaluminum level controlled by the trialkylaluminum measuring-controlling means is adjusted by the output signal from the Mooney computer, said measuring-controlling means then resetting the flow controller regulating the trialkylaluminum addition. In this latter system the "effective" catalyst level to the reactor is independent of fluctuations in poison levels in the reactor feed stream and is controlled primarily by the Mooney viscosity of the product rubber.

What I claim is:

1. A process for the determination and control of the Mooney viscosity of a rubbery polymer comprising, measuring the weight percent of polymer (solids) in a solution of polymer and producing a first signal representative thereof, measuring the solution viscosity of said solution and producing a second signal representative thereof, computing the Mooney viscosity of said solution from said first and second signals and producing a control signal representative thereof, and automatically adjusting a process variable responsive to said control signal to obtain a rubbery polymer of the desired Mooney viscosity.

2. A process for the production of a rubbery polymer comprising polymerizing a conjugated diene in a reaction zone in the presence of an initiator, recovering an effluent from said zone comprising unreacted diene and polymer, measuring the refractive index of said effluent and producing a first signal representative thereof, measuring the solution viscosity of said solution and producing a second signal representative thereof, computing the Mooney viscosity of said effluent from said first and said second signals and producing a control signal representative thereof, and automatically adjusting a process variable responsive to said control signal to obtain a rubbery polymer stream of the desired Mooney viscosity.

3. The process of claim 2 wherein said process variable comprises a concentration of initiator within said reaction zone.

4. The process of claim 2 wherein said process variable comprises the diversion of effluent having a Mooney viscosity outside a predetermined range from the polymer product stream.

5. A process for the production of rubbery polymer comprising contacting a conjugated diene in the presence of a liquid diluent in a reaction zone under polymerization conditions with an initiator comprising (A) an organometal having the formula $R_nM$, wherein M is a metal selected from the group consisting of aluminum, gallium, indium, beryllium, mercury, zinc and cadmium, R is a member selected from the group consisting of alkyl, cycloalkyl, aryl, aralkyl and alkaryl radicals containing from 1 to 20 carbon atoms per molecule and $n$ is equal to the valence of M, and (B) a member selected from the group consisting of (1) titanium tetraiodide, (2) mixtures of titanium tetrachloride and titanium tetraiodide and (3) iodine and a titanium halide having the formula $TiX_4$, wherein X is selected from the group consisting of chlorine and bromine, recovering from said reaction zone an effluent stream, adjusting the concentration of said effluent stream and removing at least a portion of the unreacted conjugated diene, recovering a polymer product stream, continuously diverting a portion of said product stream to be measured, measuring the refractive index of said portion and producing a signal representative thereof, measuring the solution viscosity of said stream and producing a second signal representative thereof, computing the Mooney viscosity from said first and second signals, and producing a control signal representative thereof, said signal actuating a logic system to control a process variable in response to changes in said control signal whereby the desired Mooney viscosity of the polymer stream is obtained.

6. The process of claim 5 wherein said process variable is the amount of initiator introduced into said reaction zone.

7. The process of claim 5 wherein said Mooney viscosity is determined from the following relationship:

$$ML = \frac{\log_{10} \mu + 789.3 - 526.8(RI)}{1.484 - 0.9798(RI)}$$

wherein
ML = Mooney viscosity
RI = refractive index
$\mu$ = solution viscosity, poise.

8. A process for the production of polybutadiene comprising introducing toluene, 1,3-butadiene and an initiator comprising triisobutylaluminum, titanium tetrachloride and iodine into a polymerization zone maintained at polymerization conditions, recovering from said reaction zone an effluent stream comprising unreacted butadiene and a solution of polybutadiene and toluene, removing at least a portion of said unreacted butadiene from said effluent stream by flashing, adjusting the concentration of said effluent stream to the range of 5 to 15 weight percent polymer, recovering a product stream comprising polybutadiene solution from said flash zone, continuously diverting a portion of said product stream to be measured, measuring refractive index of said diverted stream, and producing a first signal representative thereof, measuring the solution viscosity and producing a second signal representative thereof, computing the Mooney viscosity from said first and second signals and producing a control signal representative thereof, said signal actuating a logic system to control the amount of initiator introduced to said reaction zone in response to the computed Mooney viscosity whereby the Mooney viscosity of said polymer stream is maintained within the range of 40–50.

9. A process for the production of rubbery polymer comprising contacting a conjugated diene in the presence of a liquid diluent in the reaction zone under polymerization conditions with an initiator comprising (A) an organometal having the formula $R_nM$, wherein M is a metal selected from the group consisting of aluminum, gallium, indium, beryllium, mercury, zinc and cadmium, R is a member selected from the group consisting of alkyl, cycloalkyl, aryl, aralkyl and alkaryl radicals containing from 1 to 20 carbon atoms per molecule and is equal to the valence of M, and (B) a member selected from the group consisting of (1) titanium tetraiodide, (2) mixtures of titanium tetrachloride and titanium tetraiodide and (3) iodine and a titanium halide having the formula $TiX_4$, wherein X is selected from the group consisting of chlorine and bromine, recovering from said reaction zone an effluent stream, adjusting the concentration of said effluent stream and removing at least a portion of the unreacted conjugated diene, recovering a polymer product stream, continuously diverting a portion of said product stream to be measured, measuring the refractive index of said diverted stream and producing a signal representative thereof, measuring the solution viscosity of the stream and producing a second signal representative thereof, computing the Mooney viscosity of the sample product stream from said first and second signals and producing a control signal corresponding to the computed Mooney viscosity, said signal actuating a logic system to divert from said product stream portions of polymer outside a desired Mooney viscosity range in response to the computed Mooney viscosity whereby the Mooney viscosity of said product stream is maintained substantially constant.

10. A process for the production of polybutadiene comprising introducing toluene, 1,3-butadiene and an initiator comprising triisobutylaluminum, titanium tetrachloride and iodine into a polymerization zone maintained at polymerization conditions, recovering from said reaction zone an effluent stream comprising unreacted butadiene and a solution of polybutadiene and toluene, removing at least a portion of unreacted butadiene from said effluent stream by flashing, adjusting the concentration of said effluent stream to the range of 5 to 15 weight percent polymer, recovering a product stream comprising polybutadiene solution from said flash zone, continuously diverting a portion of said product stream to be measured, measuring the refractive index of said diverted stream, and producing a signal representative thereof of instruments producing a signal proportional to the values, measuring the solution viscosity of the stream and producing a second signal representative thereof, computing the Mooney viscosity of the sample product stream and producing a control signal representative thereof, said control signal actuating a logic system which diverts from said product stream portions of polybutadiene outside of the predetermined Mooney viscosity range in response to the computed Mooney viscosity whereby the Mooney viscosity of said polybutadiene stream is maintained substantially constant.

11. A process for the production of rubbery polymer comprising contacting a conjugated diene in the presence of a liquid diluent in the reaction zone under polymerization conditions with an initiator comprising (A) an organometal having the formula $R_nM$, wherein M is a metal selected from the group consisting of aluminum, gallium, indium, beryllium, mercury, zinc and cadmium, R is a member selected from the group consisting of alkyl, cycloalkyl, aryl, aralkyl and alkaryl radicals containing from 1 to 20 carbon atoms per molecule and $n$ is equal to the valence of M, and (B) a member selected from the group consisting of (1) titanium tetraiodide, (2) mixtures of titanium tetrachloride and titanium tetraiodide and (3) iodine and a titanium halide having the formula $TiX_4$ wherein X is selected from the group consisting of chlorine and bromine, recovering from said reaction zone an effluent stream, adjusting the concentration of said effluent stream and removing at least a portion of the unreacted conjugated diene, recovering a polymer product stream, continuously diverting a portion of said product stream to be measured, measuring the refractive index of said diverted stream and producing a signal representative thereof, measuring the solution viscosity of the stream and producing a second signal representative thereof, computing the Mooney viscosity of the sample product stream from said first and second signals and producing a control signal corresponding to the computed Mooney viscosity, diverting polymer outside of a predetermined Mooney viscosity range value from said product stream in response to said control signal, at least one portion of said polymer being above and at least one portion of said polymer being below said predetermined Mooney viscosity range, recombining these portions into the product stream in response to said computed Mooney viscosity in a ratio sufficient to maintain the Mooney viscosity of said product stream in a second desired Mooney viscosity range having narrower limits than said first desired Mooney viscosity range.

12. A process for the production of polybutadiene comprising introducing toluene, 1,3-butadiene and an initiator comprising triisobutylaluminum, titanium tetrachloride and iodine into a polymerization zone maintained at polymerization conditions, recovering from said reaction zone an effluent stream comprising unreacted butadiene and a solution of polybutadiene and toluene, removing at least a portion of unreacted butadiene from said effluent stream by flashing, adjusting the concentration of said effluent stream to the range of 5 to 15 weight percent polymer, recovering a product stream comprising polybutadiene solution from said flash zone, continuously diverting a portion of said product stream to be measured, measuring the refractive index of said diverted stream and producing a signal representative thereof, measuring the solution viscosity of the stream and producing a second signal representative thereof, computing the Mooney viscosity of the sample product stream from said first and second signals and producing a control signal corresponding to the computed Mooney viscosity, and diverting polybutadiene outside the Mooney range of 40 to 50 from said product stream in response to said control signal, at least one portion being above and at least one portion being below said Mooney viscosity range, recombining these portions into the product stream in response to said computed Mooney viscosity so as to maintain said Mooney viscosity of said final product stream in a range of 43-45.

13. In apparatus for producing a rubbery polymer comprising in combination a reactor, inlet conduits for introducing conjugated diene and catalyst into said reactor and an outlet conduit for removing a product stream from said reactor, the improvement comprising a withdrawal conduit for continuously withdrawing a portion of said product stream, means for producing a signal proportional to the solution viscosity of said withdrawn portion, means for producing a second signal proportional to the weight percent polymer of said withdrawn portion, and computing means operatively connected to said means for measuring solution viscosity and weight percent polymer receiving said signals and producing a signal proportional to the combination of said solution viscosity and weight percent polymer of said withdrawn portion.

14. Apparatus for producing a rubbery polymer comprising in combination a reactor, a first inlet conduit for introducing a conjugated diene into said reactor, a second inlet conduit for introducing an initiator which polymerizes said conjugated diene into said reactor, means for maintaining said reactor at polymerization conditions, an outlet conduit means for removing a product stream from said reactor, a third conduit means for continuously withdrawing a portion of said product stream, means for measuring the solution viscosity of said portion, means for measuring the weight percent polymer of said portion, computing means for determining a value representative of the Mooney viscosity of said portion from said measurements, means for producing a signal proportional to said value, adjusting means for varying a process variable, controlling means operatively connected to said adjusting means and said signal producing means for adjusting said process variable in response to said signal so as to maintain the Mooney viscosity substantially constant.

15. The apparatus of claim 14 wherein said adjusting means comprises valve means disposed in said second inlet conduit.

16. The apparatus of claim 14 wherein said adjusting means comprises valve means disposed in said outlet conduit for diverting polymer from said conduit which is outside a predetermined value range into a diversion conduit.

17. The apparatus of claim 16 wherein said outlet conduit contains a diversion conduit in open communication with said outlet conduit, a first valve means in said outlet conduit downstream from said diversion conduit, a first and second surge vessels for containing polymer in open communication with said diversion conduit, a second and third valve means disposed in said diversion conduit so as to regulate flow to said first and second surge vessels respectively, a first controlling means operatively connected to said computing means and said first, second and third valves opening further at least one of said valves so as to distribute the polymer stream according to a predetermined first value range, said first vessel receiving polymer above the desired range and said second vessel receiving polymer below the desired range, a fourth conduit in communication with said first and second surge vessels and said outlet conduit downstream from said first valve, a fourth and fifth valve means disposed in said fourth valves for regulating flow from said first and second vessels respectively, a second computing means for determining a second value representative of the Mooney viscosity of said polymer in said outlet conduit downstream from said fourth conduit, a second signal producing means for transmitting a signal proportional to said second value, a second controlling means operatively connected to said second signal producing means and said fourth and fifth valves opening at least one of said valves to permit flow of polymer through said fourth conduit in a quantity and at a value sufficient to further adjust the value of the polymer in said outlet conduit to a value within a second predetermined range narrower than said first predetermined range.

References Cited by the Examiner

UNITED STATES PATENTS

| | | | |
|---|---|---|---|
| 2,665,197 | 1/1954 | Rowland | 260—94.2 |
| 2,711,750 | 6/1955 | Norcross | 23—253 |
| 2,908,734 | 10/1959 | Cottle | 260—683.15 |
| 2,974,017 | 3/1961 | Morgan | 260—94.9 |
| 2,989,517 | 6/1961 | Hanson et al. | 260—95 |
| 3,099,648 | 7/1963 | Dye | 260—94.3 |

JOSEPH L. SCHOFER, *Primary Examiner.*

MORRIS LIEBERMAN, *Examiner.*